US011227096B2

(12) United States Patent
Ren et al.

(10) Patent No.: US 11,227,096 B2
(45) Date of Patent: Jan. 18, 2022

(54) ERROR DETECTION IN TEXT STRING WITHIN DISPLAYED LAYOUT

(71) Applicant: MICRO FOCUS LLC, Santa Clara, CA (US)

(72) Inventors: Yi-Qun Ren, Shanghai (CN); Kai Hu, Shanghai (CN); Le Peng, Shanghai (CN)

(73) Assignee: MICRO FOCUS LLC, Santa Clara, CA (US)

(*) Notice: Subject to any disclaimer, the term of this patent is extended or adjusted under 35 U.S.C. 154(b) by 0 days.

(21) Appl. No.: 16/870,189

(22) Filed: May 8, 2020

(65) Prior Publication Data

US 2021/0350066 A1    Nov. 11, 2021

(51) Int. Cl.

| | |
|---|---|
| G06F 40/106 | (2020.01) |
| G06T 11/00 | (2006.01) |
| G06T 7/90 | (2017.01) |
| G06F 40/134 | (2020.01) |
| G06F 40/163 | (2020.01) |
| G06F 40/103 | (2020.01) |
| G06F 16/583 | (2019.01) |
| G06F 17/00 | (2019.01) |

(52) U.S. Cl.
CPC .......... *G06F 40/106* (2020.01); *G06T 7/90* (2017.01); *G06T 11/001* (2013.01); *G06F 16/5838* (2019.01); *G06F 40/103* (2020.01); *G06F 40/134* (2020.01); *G06F 40/163* (2020.01)

(58) Field of Classification Search
CPC .... G06F 40/106; G06F 40/103; G06F 40/134; G06F 40/163; G06F 16/5838; G06F 3/0481; G06T 7/90; G06T 11/001; G06T 7/0002; G06K 9/03; G06K 9/4604; G06K 9/6202
See application file for complete search history.

(56) References Cited

U.S. PATENT DOCUMENTS

| | | | |
|---|---|---|---|
| 8,255,793 B2 | 8/2012 | Chakrabarti et al. | |
| 8,340,408 B2 | 12/2012 | Davan et al. | |
| 9,619,642 B2 | 4/2017 | Kalra | |
| 9,773,165 B2 | 9/2017 | Kumar et al. | |
| 2015/0325020 A1* | 11/2015 | Kokojima | G09G 5/26 345/629 |
| 2016/0321246 A1* | 11/2016 | Satoh | G06F 40/58 |
| 2018/0196785 A1* | 7/2018 | Levin | G06K 9/00463 |
| 2019/0057277 A1* | 2/2019 | Wang | G06T 7/13 |
| 2020/0019583 A1* | 1/2020 | Halfond | G06F 16/986 |

FOREIGN PATENT DOCUMENTS

WO    WO-2017100464 A1    6/2017

OTHER PUBLICATIONS

Althomali et al., "Automatic Visual Verification of Layout Failures in Responsively Designed Web Pages", University of Sheffield, UK; Allegheny College, USA, 2019.
Cronofy, "Automating Front End Layout Testing", Jan. 11, 2017, https://www.cronofy.com/blog/automating-front-end-layout-testing/.
"Using the Design Checker in Publisher", Microsoft, 2007 https://support.office.com/en-us/article/using-the-design-checker-in-publisher-090deb44-ba8f-4ae8-ac18-4a5bb8C70737.

\* cited by examiner

*Primary Examiner* — Quoc A Tran

(57) ABSTRACT

The color of a character of a text string within a layout is changed, and the layout is displayed. An image of the layout as displayed is captured. An error in the text string within the layout as displayed is detected by detecting the changed color of the character within the captured image.

20 Claims, 7 Drawing Sheets

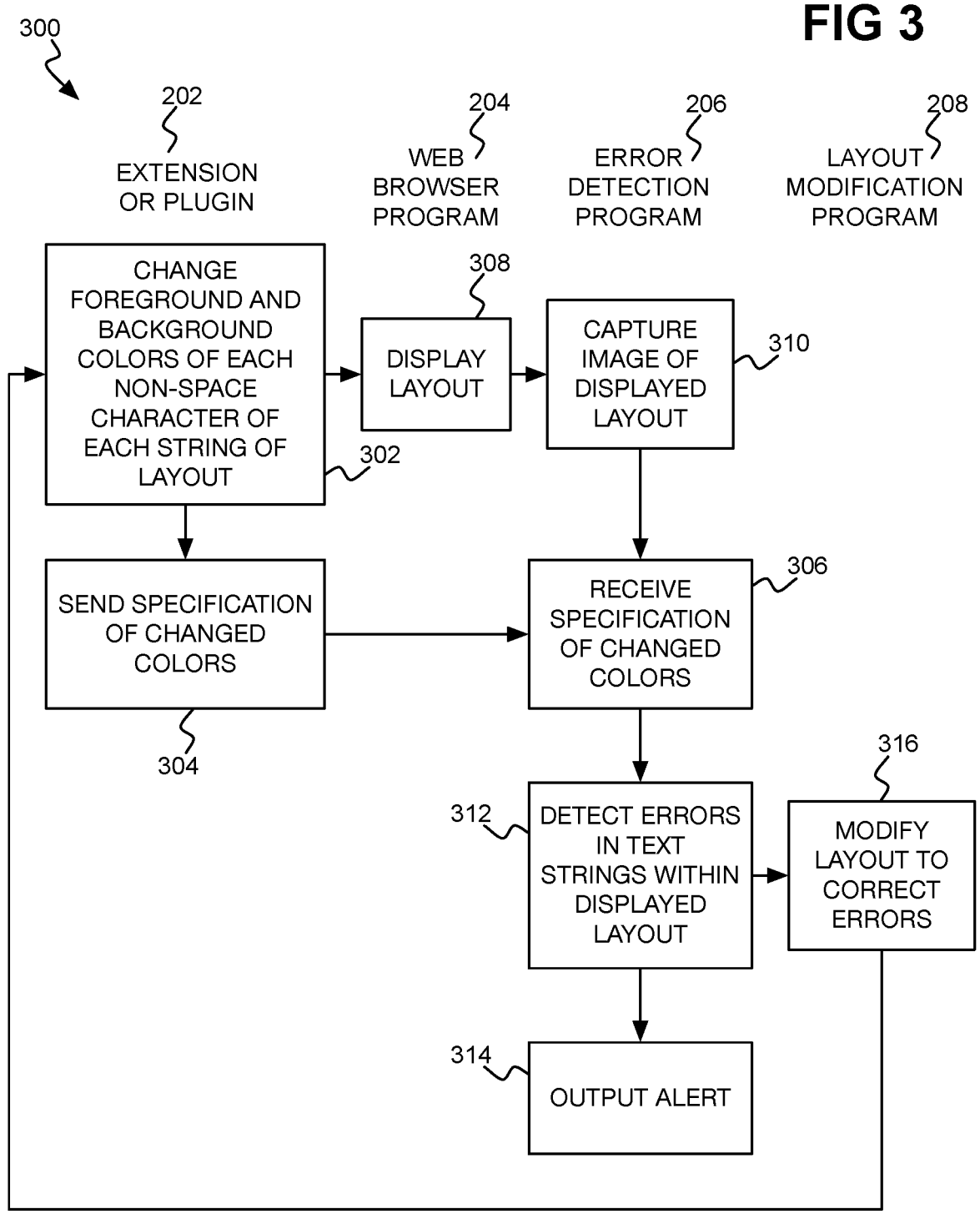

ERROR DETECTION IN TEXT STRING WITHIN DISPLAYED LAYOUT

BACKGROUND

Computer programs commonly display graphical and textual information. For example, web browser programs can render and display web pages specified in markup languages such as the hypertext markup language (HTML). As another example, other computer programs, like application programs, can display information by accessing application programming interfaces (APIs) exposed by operating systems on which the computer programs run.

BRIEF DESCRIPTION OF THE DRAWINGS

FIG. 3 is a flowchart of an example method for detecting and correcting text string errors within displayed layouts in the context of the system of FIG. 2.

DETAILED DESCRIPTION

Figure 1A:
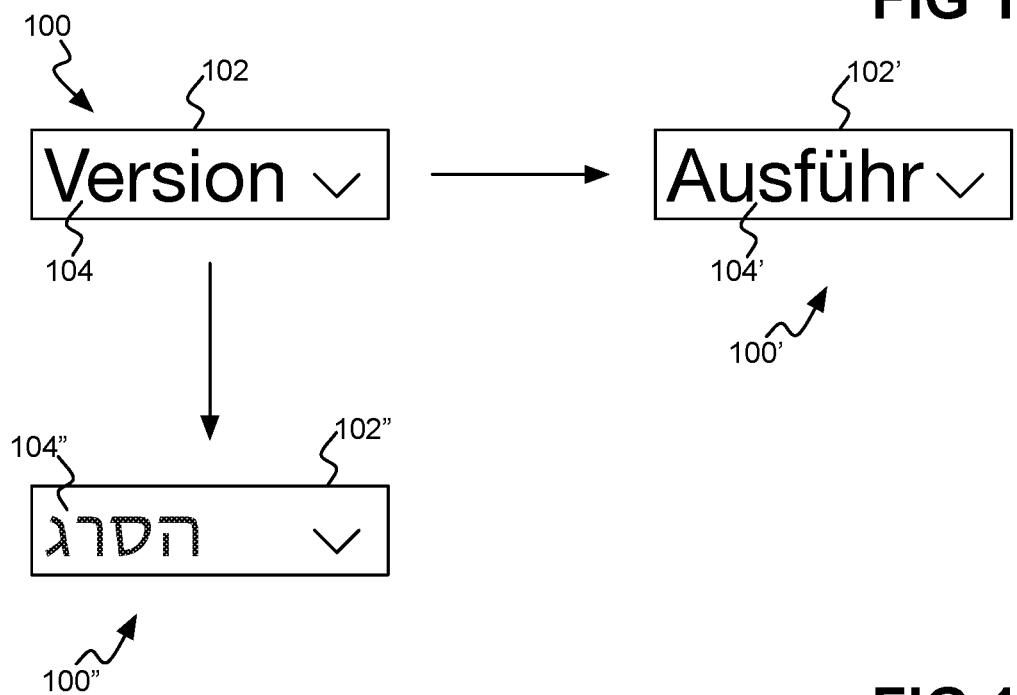
FIGS. 1A and 1B are diagrams depicting examples of some of the types of text string errors within displayed layouts that techniques presented herein can detect.

As noted in the background section, a wide variety of different types of computer programs commonly display graphical and textual information. The locations at which text elements, including text strings, and graphical elements, including user interface elements, are displayed, as well as the elements themselves, can be referred to as a layout. A layout can be specified in a markup language format for rendering and display by a web browser program, for instance, or can be hardcoded by a computer program calling operating system-exposed application programming interfaces (APIs).

Different web browser programs may render layouts defined by a markup language specification slightly differently, and likewise different versions of operating systems may render layouts defined by calling their APIs slightly differently. Furthermore, user settings as to font type and size, dots-per-inch (DPI) scaling, and so on, can also affect the rendering and resulting display of layouts. Layout localization from one language to another, such as from English to Mandarin, German, Hebrew, and so on, can also affect layout rendering and resulting display.

Described herein are techniques for detecting errors in text strings within displayed layouts. The colors of characters of the text strings can be changed within the layout prior to rendering and display of the layout. The color of a character is defined herein as the foreground color of the character, as the background color of the character, or as both the foreground and background colors of the character. An image, like a screenshot, of the displayed layout is captured. Errors in the text strings within the resultantly displayed layout can then be detected by detecting within the captured image the colors to which the characters have been changed, without having to actually detect the characters themselves.

Such techniques provide for more accurate and easier to implement detection of errors in text strings within displayed layouts than techniques that detect the characters of the text strings themselves. The myriad different ways in which text can be rendered and displayed, as well as the many different types of errors, can make accurate error detection by detecting the characters themselves difficult at best. Programmatic techniques have proven inadequate, whereas machine learning techniques usually require large amounts of relevant training data, and still provide less than desired accuracy.

For example, programmatic techniques may rely upon optical character recognition (OCR). However, such techniques have difficulty detecting with near-perfect accuracy all the myriad different manners by which text strings of different fonts and sizes can be rendered and displayed. Furthermore, OCR accuracy is reduced when text strings overlap other elements within a layout, such as graphical elements. In such cases, OCR may fail to detect the characters that overlap the graphical elements, and thus fail to detect such overlap errors. Similarly, OCR accuracy is reduced when text strings overlap one another, such that OCR may fail to detect overlapping characters and thus fail to detect these types of errors.

Machine learning techniques have similar shortcomings. For machine learning to successfully detect different types of errors in the display of text strings, large amounts of training data for all these types of errors have to first be provided to the machine learning model that will be used. Obtaining such copious amounts of training data is difficult and laborious in practice, with no guarantee that the resultantly trained model will be able to detect specific instances of text string display errors that may occur—specifically those that have had not been contemplated beforehand.

Figure 1B:
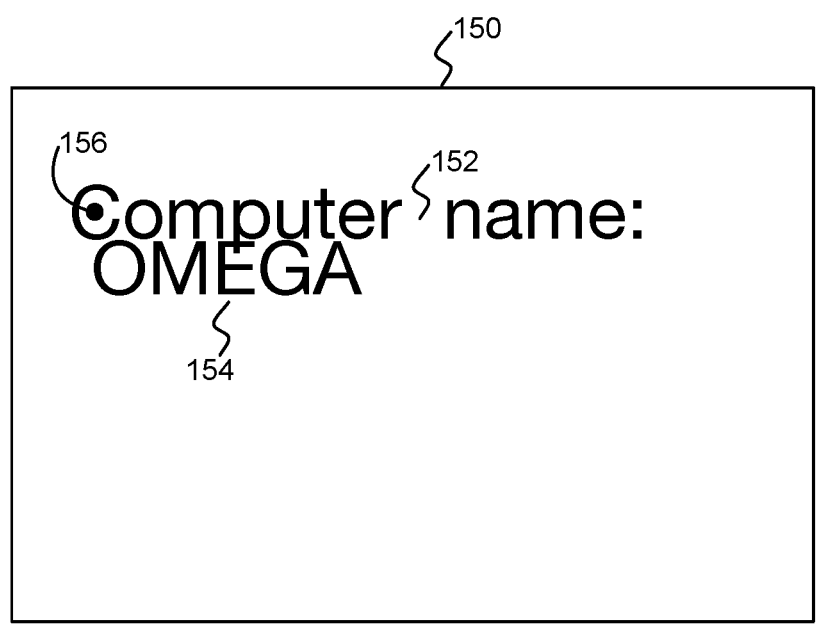

FIGS. 1A and 1B shows examples of some of the types of text string errors within displayed layouts that techniques presented herein can detect. In FIG. 1A, a layout 100 includes a dropdown menu graphical user interface (GUI) element 102 with the text string "Version" 104. The layout 100 is localized in German as the layout 100', and is localized in Hebrew as the layout 100". The German word for "Version" is "Ausführung," whereas the Hebrew word for "Version" is " "גרסה". "

The error in the text string 104' of the dropdown menu GUI element 102' of the layout 100' is that the German word "Ausführung" has been improperly cutoff or truncated, with the three characters at the end of the word not being displayed. This example error is thus a truncation error. The error in the text string 104" of the dropdown menu GUI element 102" of the layout 100" is that the characters of the Hebrew word " "גרסה". " has been improperly reversed: Hebrew is written right-to-left instead of from left-to-right as English is. This example error is thus a reversal error.

Manual detection of these errors can be difficult. A tester who knows English may be able to verify that the layout 100 is displayed correctly, but is less likely to detect that the German and Hebrew localized layouts 100' and 100" are displayed incorrectly. A tester who does not know German may not detect the text string truncation error in the layout 100', and a tester who does not know Hebrew may not detect the reversal error in the layout 100". Automated detection of these errors via detection of the characters themselves has also proven difficult.

In FIG. 1B, a layout 150 includes a text string "Computer name:" 152 and a text string "OMEGA" 154, and a graphical element 156, which is specifically a small dot or shaded circle. A first error in the layout 150 is that the descender or stem of the lower-case letter "p" in the text string 152 overlaps the top horizontal bar of the upper-case letter "E" in the text string 154. This example error is particularly one type of text string overlap error. It is noted that the other letters of the text string 154 do not overlap any letter in the text string 152. If the lower-case letter "p" were absent from the text string 152, there would be no overlap error between the text strings 152 and 154.

Furthermore, it is noted that if the background of the text string 154 were not transparent and had layer priority over the text string 152, a similar error would occur in that the letter "E" in the string 154 would overlap the letter "p" in the text string 152. However, in such instance, the descender of the letter "p" would effectively be cut off by the non-transparent background of the letter "E." In case instance, the resulting error would be another type of text string overlap error. Two types of text string overlap errors may therefore be detected: text string overlap when the text strings both have transparent backgrounds, and text string overlap when either or both text strings have non-transparent backgrounds.

A second error in the layout 150 is that the upper-case letter "C" in the text string 152 overlaps the graphical element 156. Specifically, the dot or shaded circle of the graphical element 156 is within the center portion of this character of the text string 152. While the graphical element 156 is not adjacent to and does not overlap any portion of the foreground of this character—i.e., the dot is not adjacent to and does not overlap the actual curve of the letter "C"—the presence of the dot within the character's background is still considered an overlap error.

Manual error detection techniques may miss either or both of these errors. For instance, the dot of the graphical element 156 may be sufficiently small that a tester misses its presence within the text string 152. Similarly, the limited overlap between the text strings 152 and 154 may result in a tester failing to recognize this text string error. That is, without careful inspection, the tester may similarly miss the limited overlap between the text strings 152 and 154. Automated detection of such overlap errors via detection of the characters themselves has also proven difficult.

The techniques described herein can detect specific instances, or test cases, of different types of text string errors, such as those that have been described in relation to FIGS. 1A and 1B. The text strings of a layout can be static or dynamic. The actual characters of a static text string may be specified within the layout itself, or otherwise remain the same across different test case instances of the layout. By comparison, the actual characters of a dynamic text string can differ across different test case instances. For example, the actual characters may be specified by a content source specified within the layout, where the content source can provide different text at different times.

Some instances of dynamic text strings may result in text string errors, whereas other instances may not. Therefore, multiple test cases may be specified, with the actual characters of a dynamic text string varying across the test cases. The techniques described herein detect whether any such test case includes a dynamic text string error. The ability to detect dynamic text string errors within a given layout therefore increases with the number of different test cases that are run.

Figure 2:
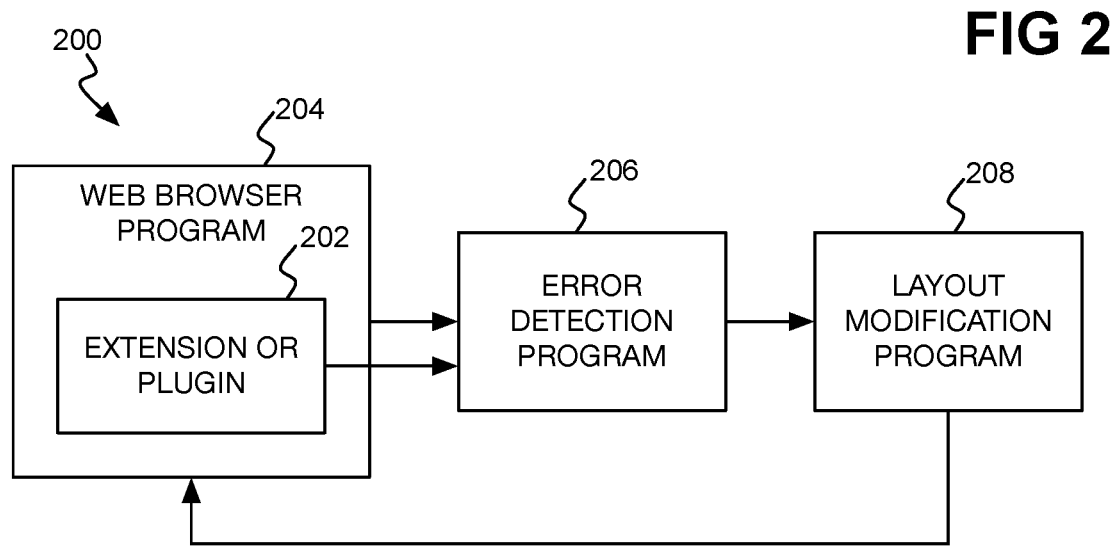
FIG. 2 is a diagram of an example system for detecting and correcting text string errors within displayed layouts.

FIG. 2 shows an example system 200 for detecting and correcting text string errors within displayed layouts. Other systems can also be employed for detecting such text string errors, however. The system 200 specifically pertains to detecting text string errors within layouts of web pages, which may be specified in a markup language. The system 200 includes an extension or plugin 202 executing within a web browser program 204, as well as an error detection program 206. The system 200 can further include a layout modification program 208, such as an integrated development environment (IDE).

A general overview of how the system 200 operates is now described, with a more detailed description provided later in relation to FIG. 3. The extension or plugin 202 changes the color of each of one or more of the characters of each text string of the layout of a web page. The web browser program 204 then displays the resultantly changed layout. The error detection program 206 captures an image of the layout as displayed, and from the extension or plugin 202 receives specification of the colors to which the characters of the text strings have been changed.

The error detection program 206 detects text string errors, such as the truncation, reversal, and overlap errors of FIGS. 1A and 1B, by detecting the specified colors within the captured image. The error detection program 206 may provide a notification of any detected such errors, which the layout modification program 208 may then correct. This process can be iteratively repeated until no text string errors are detected. The layout modification program 208 may automatically modify the layout to resolve the errors without user interaction, or a user may instead manually modify the layout.

FIG. 3 shows an example method 300 by which the system 200 detects and corrects text string errors within displayed layouts. The method 300 is divided over four columns corresponding to the extension or plugin 202, the web browser program 204, the error detection program 206, and the layout modification program 208, which perform their respective parts of the method 300. The method 300 may be implemented as program code stored on a non-transitory computer-readable data storage medium and executable by a processor of a computing device.

In one implementation, the extension or plugin 202 changes the foreground and background colors of each non-space character of each text string within a layout (302). More generally, the foreground and/or background color of each of one or more characters of each text string can be changed. As noted above, the color of a character is defined as the character's foreground color, as the character's background color, or as both the character's foreground and background colors. The color (e.g., the foreground and/or background color) of just the first character of each text string, of just the last character of each text string, or of each of the first and last characters may be changed. The first and last characters of a text string may be the string's first and last non-space characters.

The foreground of a character of a text string is the color of the actual character itself, such as the lines, curves, and so on, making up the character. The background of the character is the rectangular space against which the foreground of the character is displayed. For a given font size of a given font, the background of each character may be identical in height. The width of each character, by comparison, may vary if the font is a proportional font and may be identical if the font is a non-proportional font.

The extension or plugin 202 can change the color of each character of each text string to a unique color within the layout. That is, no other element of the layout has the color to which a character of a text string is changed; the color otherwise does not appear within the layout. If both the foreground and background colors of each such character are changed, the foreground color of each character is unique within the layout, as is the background color of each character.

In another implementation, the extension or plugin 202 can change the color of each character of each text string to a color in correspondence to the position of the character within its text string. Therefore, the characters of different text strings at corresponding positions within their strings are changed to the same color. For example, the first character of every text string may have its foreground and/or background colors changed to first and/or second colors, the second character of every text string may have its foreground and/or background colors changed to third and/or fourth colors, and so on.

In one implementation, the layout for a web page specified in a markup language, such as the hypertext markup language (HTML). In such an implementation, the extension or plugin 202 can change the color of a character of a text string of a layout by wrapping the character within a "mark" HTML element, and by setting "color" and "background" inline cascading style sheet (CSS) properties within the element to unique color values. The extension or plugin 202 can change the color of a character of a text string of a layout in another manner as well.

The extension or plugin 202 sends the specification of the colors to which it has changed each character to the error detection program 206 (304), which receives this specification of the changed colors (306). The web browser program 204 displays the layout as has been modified by the extension or plug 202 (308), which can include first rendering the layout. The error detection program 206 then captures an image of the layout that has been displayed (310), such as by taking a screenshot of a window of the web browser program 204 in which the web page having the layout has been displayed.

The error detection program 206 detects errors in the text strings within the layouts as displayed (312), by detecting the changed colors of the non-space characters of the text strings within the captured image of the displayed layout. The error detection program 206 does not actually detect the characters themselves—e.g., the program 206 does not perform OCR or any other character detection technique. Rather, the error detection program 206 detects, within the captured image, just the colors to which the characters have been changed within the layout, and not the characters themselves.

How the method 300 can detect certain types of text string errors is now described generally. These types of text string errors are truncation errors, reversal errors, and overlap errors. More particular techniques for detecting such certain types of text string errors is described later in the detailed description, with reference to FIGS. 4A-4C.

If the color to which a character of a text string has been changed is not detected within the captured image, then a truncation error of the string is detected. This is why in one implementation just the colors of non-space characters are changed. If a text string ends with a space, and the space is truncated, there is no meaningful difference as compare to if the space was not truncated. Because the color of the space is not changed, the absence of the space within the captured image is not detected, and accordingly no truncation error is detected.

If the detected color to which the first character of a text string has been changed is out of order relative to the color to which the last character of the string has been changed, then a reversal error of the string is detected. For example, if the text string is in a right-to-left language like Hebrew or Arabic, then the changed color of the first character should appear to the right of the changed color of the last color. By comparison, if the text string is in a left-to-right language like English, then the changed color of the first character should appear to the left of the changed color of the last color.

Whether a text string is in a right-to-left human language or a left-to-right human language—so that whether there is a reversal error in the displayed text string can be detected—can be determined in a number of different ways. For example, the layout itself may specify the language of a text string. As another example, the system 200 that is detecting text string errors may have a default language that is a left-to-right or a right-to-left language. In such instance, if the layout does not override the default language for a text string, then whether there is a reversal error in the text string is detected based on the default language.

If the changed background color of a character of a text string contains any color other than the changed foreground color to the character, then an overlap error is detected. For instance, the overlap may be between the character and a graphical element of the layout having the additionally detected color. Similarly, if the changed foreground color of a first text string overlaps the changed foreground color of a character of a second text string has been changed, then an overlap error of the first string and the second string is detected.

The error detection program 206 can output an alert indicating the errors that have been detected (314). The layout modification program 208 can instead or additionally modify the layout to correct the detected errors (316). For example, the error detection program 206 can notify the layout modification program 208 of the detected errors. Based on this information, the layout modification program 208 may modify the layout, such as in an automated manner, to correct the detected errors. For example, the displayed length of the text sting may be increased, the characters may be reversed, the location of the text string may be moved, and/or the like. In this case, the layout modification program 208 may at least partially reside on the computing device that provides the web browser program 204. The method 300 may be iteratively repeated at part 302 until no errors are detected.

Figure 4A:
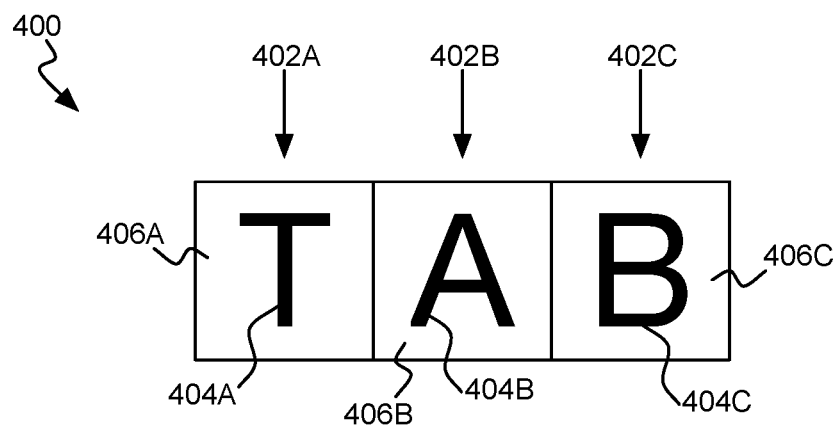
FIGS. 4A, 4B, and 4C are diagrams illustratively depicting example performance of text string error detection per the method of FIG. 3.
Figure 4B:
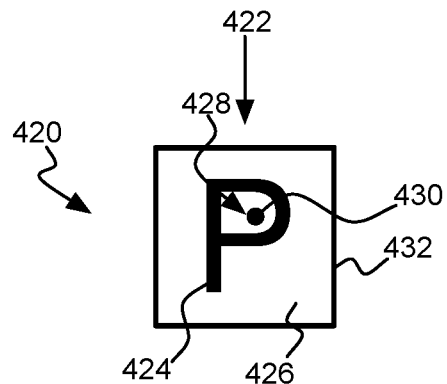
Figure 4C:
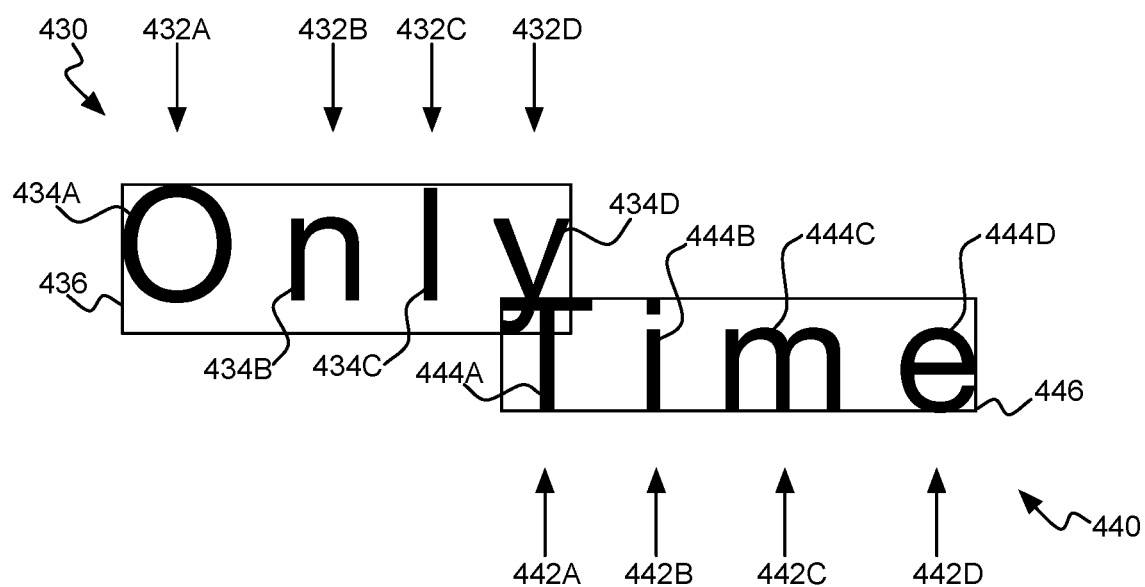

FIGS. 4A, 4B, and 4C depict example performance of text string error detection in the method 300. That is, FIGS. 4A, 4B, and 4C describe in more detail how text string errors can be detected in the method 300. In FIG. 4A, a text string "TAB" 400 includes characters 402A, 402B, and 402C, respectively corresponding to the letters "T," "A," and "B." The characters 402A, 402B, and 402C have different changed foreground colors 404A, 404B, and 404C, respectively. The characters 402A, 402B, and 402C similarly have different changed background colors 406A, 406B, and 406C, respectively. Each of the colors 404 and 406 is unique within the layout of which the text string 400 is a part.

The captured image of the displayed layout including the text string 400 is inspected to determine whether the foreground and background colors 404 and 406 of the characters 402 are present in the image. If any foreground color 404 or any background color 406 is absent, then detection of the color in question will be unsuccessful. Therefore, a truncation error of the text string 400 within the displayed layout is detected. For example, just the first two letters "TA" of the text string 400 may be displayed. The foreground color 404C and the background color 406C of the character 402C will thus not be detected.

Manual detection, or a different type of automated detection, of such a truncation error may be difficult. This is because the letter sequence "TA" is the acronym for the phrase "teaching assistant." Therefore, such manual or automated detection may incorrectly conclude that there is no truncation error. The techniques described herein, by comparison, correctly detect the truncation error, because the colors 404C and 406C of the character 402C are not detected within the captured image.

The captured image of the displayed layout including the text string 400 is also inspected to determine the order of the foreground colors 404 and/or the background colors 406 within the image. For instance, if when the layout including the text string 400 is displayed the letter sequence "BAT" is instead displayed, then the detection of the foreground and background colors 404A and 406A of the character 402A will be detected out of order relative to the foreground and background colors 404B and 406B of the character 402B. Specifically, the colors 404A and 406A will be detected after—not before—the colors 404B and 406B. A reversal error of the text string 400 within the displayed layout will thus be detected.

Manual detection, or a different type of automated detection, of such a reversal error may also be difficult. This is because the letter sequence "BAT" is also a proper word in English. Therefore, such manual or automated detection may incorrectly conclude that there is no reversal error. By comparison, the techniques described herein correctly detect the reversal error, because the colors 404A and 406A are detected out of order relative to the colors 404B and 406B within the captured image.

In FIG. 4B, a text string 420 includes a character 422 corresponding to the letter "P." The character 422 has a changed foreground color 424 and a changed background color 426. Each of the colors 424 and 426 is unique within the layout of which the text string 420 is a part. The layout part also includes a graphical element 428, specifically a dot. The dot has a color 430. Because the colors 424 and 426 are each unique within the layout, the color 430 is different than the colors 424 and 426.

A bounding box 432 surrounding the background color 426 is considered within the captured image of the displayed layout including the text string 420, and the colors within the bounding box 432 detected. The bounding box 432 in the example of FIG. 4B can be at a character level. That is, a bounding box is considered for each character of the text string 420, as opposed to a bounding box for the text string 420 as a whole. The bounding box 432 is determined using just the captured image.

The bounding box 432 can be a rectangular box having top and bottom horizontal sides and left and right vertical sides. The top and bottom horizontal sides can be determined by detecting the topmost and bottommost pixels of the background color 426 within the captured image. The top horizontal side is a horizontal line extending through the pixel immediately above the detected topmost pixel and the bottom horizontal side is a horizontal line including and extending through the pixel immediately below the detected bottommost pixel.

The left and right vertical sides of the bounding box 432 can be determined by detecting the leftmost and rightmost pixels of the background color 426 within the captured image. The left vertical side is a vertical line including and extending through the pixel immediately to the left of the detected leftmost pixel. The right vertical side is a vertical line including and extending through the pixel immediately to the right of the detected rightmost pixel.

Two other colors are detected in the bounding box 432 in addition to the background color 426 that the box 432 surrounds: the foreground color 424 and the color 430. Because a color other than the foreground color 424 has been detected within the bounding box 432 in addition to the background color 426—namely, the color 430—an overlap error is therefore detected. The overlap error that is detected is specifically overlap of the text string 420 of which the character 422 is a part and the graphical element 428 having the color 430.

In FIG. 4C, a text string 430 includes characters 432A, 432B, 432C, and 432D. The characters 432A, 432B, 432C, and 432D have changed foreground colors 434A, 434B, 434C, and 434D, respectively. Also in FIG. 4C, a text string 440 includes characters 442A, 442B, 442C, and 442D. The characters 442A, 4426, 442C, and 442D have changed foreground colors 444A, 444B, 444C, and 444D, respectively. The colors 434 and 444 are each unique within the layout including the text strings 430 and 440.

A bounding box 436 surrounding the foreground colors 434 of the characters 432 of the text string 430 is considered within the captured image of the displayed layout including the text strings 430 and 440. A bounding box 446 surrounding the foreground colors 444 of the characters 442 of the text string 440 can additionally or instead be considered within the captured image. The bounding boxes 436 and 446 in the example of FIG. 4C can be at a text string level. That is, a bounding box 436 is considered for the characters 432 of the text string 430 as a whole, and a bounding box 446 is considered for the characters 442 of the text string 440 as a whole.

The bounding boxes 436 and 446 are determined using just the captured image. The bounding boxes 436 and 446 can each be a rectangular box having top and bottom horizontal sides and left and right vertical sides. How the horizontal and vertical sides of the bounding box 436 can be determined is described, but the horizontal and vertical sides of the bounding box 446 can be determined in a similar manner.

The top and bottom horizontal sides of the bounding box 436 can be determined by detecting the topmost and bottommost pixels of the foreground color 434 of any character 432 of the text string 430 within the captured image. The top horizontal side is a horizontal line including and extending through the pixel immediately above the detected topmost pixel. The bottom horizontal side is a horizontal line including and extending through the pixel immediately below the detected bottommost pixel.

The left and right vertical sides of the bounding box 436 can be determined by detecting the leftmost and rightmost pixels of the foreground color 434 of any character 432 of the text string 430 within the captured image. The left vertical side is a vertical line including and extending through the pixel immediately to the left of the detected leftmost pixel. The right vertical side is a vertical line including and extending through the pixel immediately to the right of the detected rightmost pixel.

The colors within either or both of the bounding boxes 436 and 446 are detected. If the foreground color 444 of any character 442 of the text string 440 is detected within the bounding box 436 for the text string 430, then an overlap error of the text strings 430 and 440 is detected. If the foreground color 434 of any character 432 of the text string 430 is detected within the bounding box 440, then an overlap error of the text strings 430 and 440 is likewise detected.

In the specific example of FIG. 4C, the foreground color 444A of the character 442A of the text string 440 is within the bounding box 436. Likewise the foreground color 434D of the character 432D of the text string 430 is within the bounding box 446. Therefore, an overlap error of the text strings 430 and 440 is detected.

The bounding boxes 436 and 446 of the foreground colors 434 and 444 of the text strings 430 and 440 are considered, as opposed to, for instance, bounding boxes of background colors of the text strings 430 and 440. This is because if such background color bounding boxes overlapped but the foreground color bounding boxes 436 and 446 did not, then the text strings 430 and 440 would not actually overlap. Character background colors may thus not be considered to detect this type of overlap error.

Figure 5:
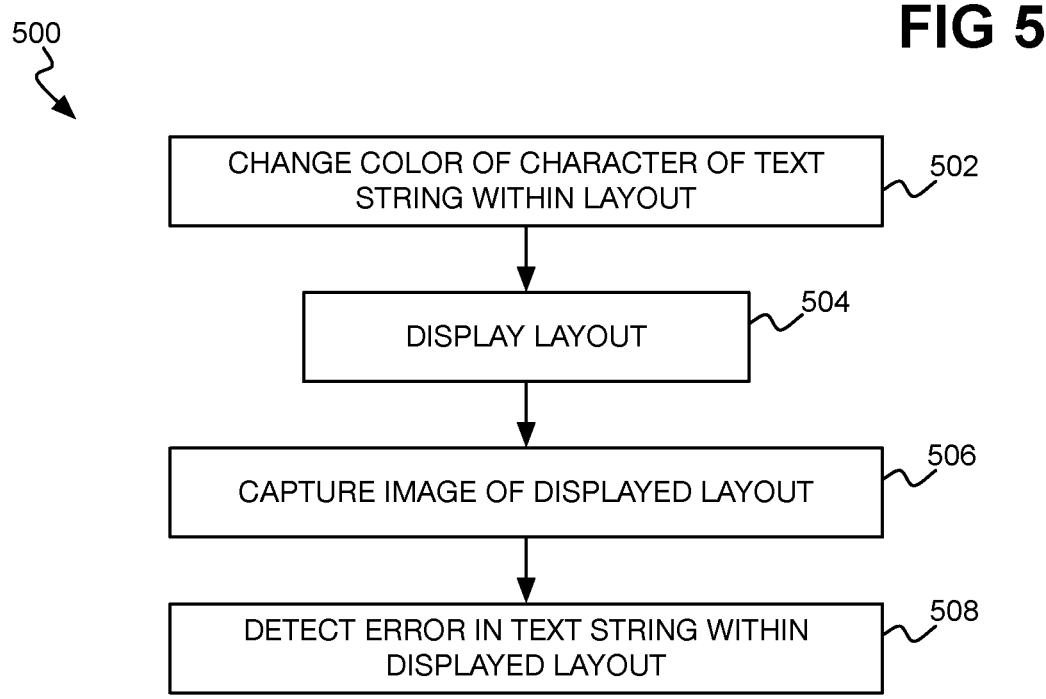
FIG. 5 is a flowchart of an example method that is consistent with but more general than the method of FIG. 3.

FIG. 5 shows an example method 500. The method 500 is consistent with but more general than the method of FIG. 3. The method 500 can be performed by a computing system, such as that of FIG. 2. The method 500 includes changing a color of a character of a text string within a layout (502), and then displaying the layout (504). The method 500 includes capturing an image of the layout as displayed (506). The method includes detecting an error in the text string within the layout as displayed by detecting the changed color of the character within the captured image (508).

Figure 6:
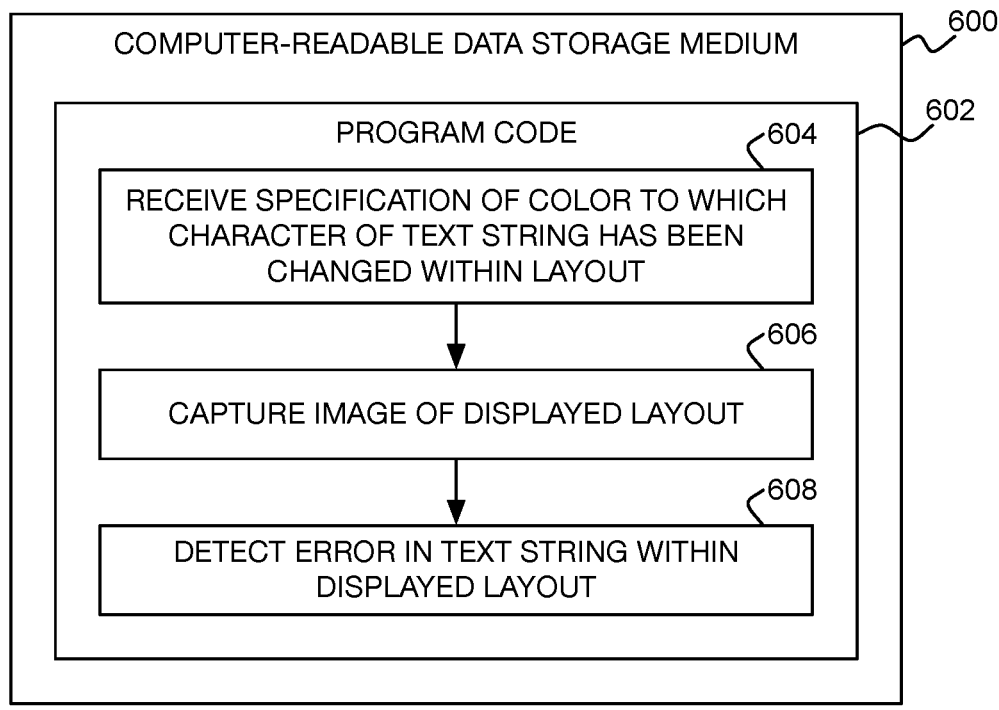
FIG. 6 is a diagram of an example computer-readable data storage medium.

FIG. 6 shows an example non-transitory computer-readable data storage medium 600. The computer-readable data storage medium stores program code 602 executable by a processor to perform processing. The processing may be a processor of a computing system, like that of FIG. 2. The processing is consistent with but more general than the method of FIG. 3. The processing includes receiving specification of a color to which a character of a text string has been changed within a layout (604), and capturing an image of the layout as displayed (606). The processing includes detecting an error in the text string within the displayed layout by detecting the color within the layout (608).

Figure 7:
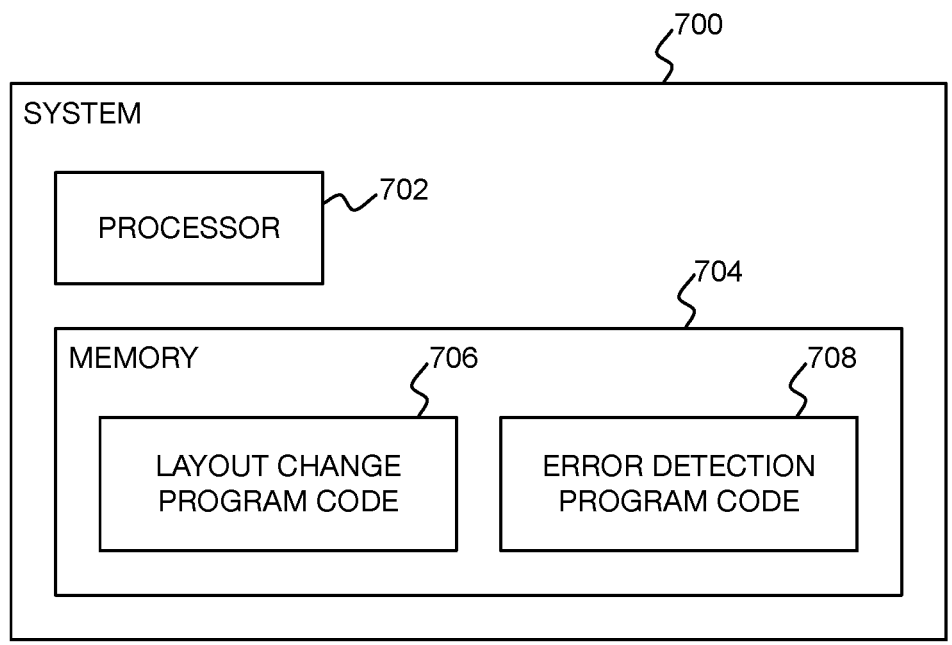
FIG. 7 is a diagram of an example system that is consistent with but more general than the system of FIG. 2.

FIG. 7 shows an example system 700. The system 700 is consistent with but more general than the system of FIG. 2. The system 700 includes a processor 702, and a memory 704 storing program code executable by the processor 702. The program code includes layout change program code 706 to change a color of a character of a text string within a layout. For instance, the layout change program code 706 may be an extension or plugin code executable within a web browser program that is executable by the processor and that is to display the layout.

The program code further includes error detection program code 708. The error detection program code 708 is to receive specification of the changed color from the layout change program code. The error detection program code 708 captures an image of the layout as it is displayed. The error detection program code 708 detects an error in the text string within the layout as displayed by detecting the changed color of the character within the captured image.

Techniques have been described herein for detecting errors in text strings within displayed layouts. The techniques change colors of characters of the text strings within the layout and then detect the changed colors within a captured image of the layout, instead of detecting the actual characters themselves. The techniques can therefore accurately detect text string errors within the layout as displayed.

We claim:

1. A method comprising:

changing a color of a first character of a text string within a layout to a first color different than a color indicated by the layout for the first character and changing a color of a second character of the text string to a second color different than the first color and different than a color indicated by the layout for the second character;

displaying the layout;

capturing an image of the layout as displayed; and detecting an error in the text string within the layout as displayed by detecting the changed color of each of the first and second characters within the captured image, and detecting that the second color is out of order relative to the first color within the captured image as compared to an order of the first character and the second character within the text string as indicated by the layout, wherein the error comprises a reversal error of the text string within the layout as displayed in that the second character appears before the first character within the layout as displayed instead of after the first character as indicated by the layout.

2. The method of claim 1, further comprising:

outputting an alert indicating the error that has been detected.

3. The method of claim 1, further comprising:

modifying the layout in an automated manner to correct the error that has been detected.

4. The method of claim 1, wherein detecting the changed color of each of the first and second characters within the captured image comprises detecting the first and second colors within the captured image.

5. The method of claim 1, wherein detecting the changed color of each of the first and second characters comprises detecting the changed color of each of the first and second characters within the captured image without specifically detecting the first or second character itself.

6. The method of claim 1, wherein the each of the first and second colors is a unique color not indicated by the layout for any character.

7. The method of claim 1, further comprising changing a color of each of a plurality of characters of the text string.

8. The method of claim 1, further comprising changing the color of every non-space character of the text string.

9. The method of claim 1, wherein changing the color of the character of the text string within the layout comprises changing the color of the first character to the first color corresponding to a position of the character within the text string, wherein a character of every text string within the layout at a same position is changed to a same color.

10. The method of claim 1, wherein the text string is a dynamic text string, and wherein the method is repeated a number of times for different instances of the dynamic text string.

11. A non-transitory computer-readable data storage medium comprising program code executable by a processor to perform processing comprising:

receiving specification of a first color to which a background color a character of a text string has been changed within a layout and a second color to which a foreground color of the character has been changed within the layout, the first color different than the second color, the first and second colors each different than a color indicated by the layout for the character;

capturing an image of the layout as displayed; and detecting an error in the text string within the displayed layout by detecting the first and second colors within the layout, and detecting a third color different than the first and second colors within a bounding box of the first color, wherein the error comprises an overlap error of the text string and a graphical element having the third color within the layout as displayed.

12. The non-transitory computer-readable data storage medium of claim 11, wherein processor is to detect the error in the text string of the displayed layout by detecting the first and second colors within the layout without specifically detecting the character itself.

13. The non-transitory computer-readable data storage medium of claim 11, wherein the processing further comprises:

outputting an alert indicating the error that has been detected.

14. The non-transitory computer-readable data storage medium of claim 11, wherein the processing further comprises:

modifying the layout in an automated manner to correct the error that has been detected.

15. The non-transitory computer-readable data storage medium of claim 11, wherein the each of the first and second colors is a unique color not indicated by the layout for any character.

16. A system comprising:

a processor; and a memory storing program code executable by the processor, the program code comprising:

layout change program code to change a foreground color of a character of a text string within a layout to a first color and a background color of the character to a second color different than the first color, the first and second colors each different than a color indicated by the layout for the character;

error detection program code to receive specification of the changed foreground and background colors from the layout change program code, capture an image of the layout as displayed, and detect an error in the text string within the layout as displayed by detecting the second color within a bounding box of the first color within the captured image, wherein the error comprises an overlap error of the first and second text strings within the layout as displayed.

17. The system of claim 16, wherein the layout program code comprises an extension or plugin code executable within a web browser program executable by the processor and that is to display the layout.

18. The system of claim 16, wherein the program code is executable by the processor to further:

output an alert indicating the error that has been detected.

19. The system of claim 16, wherein the program code is executable by the processor to further:

modify the layout in an automated manner to correct the error that has been detected.

20. The system of claim 16, wherein the error is detected in the text string of the displayed layout without specifically detecting the character itself.

\* \* \* \* \*